Patented Oct. 22, 1935

2,018,634

UNITED STATES PATENT OFFICE 2,018,634

METHOD OF REFINING ROSIN

Joseph N. Borglin, Wilmington, Del., assignor to Hercules Powder Company, Wilmington, Del., a corporation of Delaware No Drawing. Application November 29, 1932, Serial No. 644,827

28 Claims. (Cl. 87—2)

This invention relates to improvement in method for refining rosin. More particularly, the method relates to the refining of rosin through the removal of color bodies therefrom. The method may be applied to either wood or gum rosin.

It is well known that wood rosin and the lower grades of gum rosin contain objectionable coloring matter rendering them disadvantageous for use in the commercial arts in products where lightness of color is a desirable characteristic. Further, wood rosin and low grade gum rosin have also been recognized to contain certain latent color bodies which, while they do not effect the color of the rosin as such, tend to darken under certain conditions as, for example, on aging of the rosin or in the presence of an alkali and air, as where the rosin is utilized for the manufacture of soap. The presence of latent color bodies in rosin renders such rosin, and especially wood rosin which normally contains latent color bodies, substantially unusable in the production of light colored soaps, sizes, limed varnishes, etc., since where the rosin is an ingredient of such products the latent color bodies darken and deleteriously effect the color of the product.

Now in accordance with this invention, I have found that coloring matter generally and latent color bodies in particular may be largely if not completely removed from rosin by suitable treatment of the rosin with resorcinol and a boron compound having a capacity for facilitating the action of the resorcinol as, for example, boric anhydride, sodium tetraborate (borax), boric acid, boron triacetate, etc., it having been found that certain boron compounds substantially promote and increase the efficiency of the resorcinol heretofore known as a refining agent for rosin and hence enable economy in the use of resorcinol and effect increase in the yield of refined rosin.

The treatment, generally speaking, involves contacting of the resorcinol and a suitable boron compound with rosin to be refined followed by separation of the resorcinol and boron compound together with coloring matter and latent color bodies from the rosin. In carrying out the treatment, the rosin may be treated as such or, and as is more desirable, in solution in a suitable solvent, as gasoline, or other light petroleum distillate, turpentine, or other well known solvent for rosin which will be immiscible or capable of being rendered immiscible with the resorcinol and boron compound.

If desired, contact between the rosin under treatment and the resorcinol-boron compound may be promoted by dissolving the rosin in the resorcinol, adding a suitable boron compound and subsequently precipitating refined rosin, or where the rosin is treated in solution in a solvent, as gasoline, by agitation or more efficiently by heating, as for example, by refluxing of the rosin solution and resorcinol and boron compound.

As a specific illustration of the practical adaptation of the method embodying this invention to the refining of, for example, wood rosin, for example, 10 to 500 parts of a 14% solution of FF rosin in gasoline are added 13 parts resorcinol and one part boric acid. The mixture may be intimately contacted by violent agitation or more desirably, for example, by refluxing for one hour followed by cooling to about 20° C. to promote separation of the resorcinol and boric acid from the gasoline-rosin solution. The mixture will separate into an upper layer comprising substantially gasoline-refined rosin solution and a lower layer comprising substantially resorcinol and boric acid containing coloring matter and latent color bodies in solution. After separation the gasoline refined rosin layer is drawn or decanted off, desirably washed with water or with dilute alcohol to remove any residual resorcinol remaining therein and finally the gasoline is evaporated off for recovery of refined rosin. The rosin recovered will be found to be of a greatly improved color; i. e. light colored, and will be found to be largely free from latent color bodies, thus enabling its use for the production of, for example, a soap, without darkening. In the example given involving the treatment as indicated of FF wood rosin, a yield of about 83% of rosin grading N in color will be obtained.

As further illustrative, for example, following the above illustration but with the use of, for example, 5 parts of boric acid in place of 1 part, a yield of about 86% of rosin, grading WG in color will be obtained.

If desired, the rosin or rosin solution may be treated with the resorcinol and boron compound in solution in a suitable solvent therefor which will be immiscible or capable of being rendered immiscible with the rosin solvent where the rosin is treated in solution. As solvents for the resorcinol and boron compound there may be used, for example, an organic solvent, as an aliphatic alcohol, ethyl, methyl, etc. alcohol, acetone, etc.

As illustrative of the procedure using a solvent for the resorcinol and boric acid, for example, 300 parts of a solution of rosin in gasoline (15% rosin) is heated to say a temperature of about 50° C. to solution with 11 parts resorcinol, 1 part of boric acid and 30 parts of 85% alcohol. The solution is then cooled to a temperature of say about 15° C. and permitted to separate into an upper layer including gasoline-rosin solution and a lower layer including resorcinol-boric acid-color body solution in alcohol, which is drawn off. The upper layer comprising gasoline purified rosin solution is then washed with about 1 part by volume of about 85% alcohol for removal of any remaining resorcinol, water washed and the gasoline evaporated. An 84% yield of rosin grading "K" in color is obtained.

As a further illustration using, for example, boric anhydride, 500 grams of a 14% solution of FF rosin in gasoline, 13 grams of resorcinol and 1 gram of boric anhydride are refluxed for about two hours, then cooled to room temperature and, after separation, the gasoline-rosin solution decanted, washed with water or dilute alcohol and the refined rosin recovered by evaporation off of the gasoline. The product, which will amount to about 87% of the rosin treated, will grade M in color.

As a further illustration using, for example, sodium tetraborate (borax), 500 grams of a 14% solution of FF wood rosin in gasoline, 13 grams of resorcinol and 5 grams of borax are refluxed for about two hours, then cooled to room temperature, the gasoline-rosin solution decanted, washed as such of substantial immiscibility with resorcinol and boric acid with a mixture of resorcinol and boric acid, separating resorcinol, boric acid and color bodies from rosin-solvent solution, washing the rosin-solvent solution to remove residual resorcinol and recovering refined rosin from the rosin-solvent solution.

5. The method of refining rosin which includes admixing rosin in solution in a solvent capable as such of substantial immiscibility with resorcinol and boric acid with a mixture of resorcinol and boric acid, heating the mixture, cooling the mixture, separating resorcinol, boric acid and color bodies from rosin-solvent solution, washing the rosin-solvent solution to remove residual resorcinol and recovering refined rosin from the rosin-solvent solution.

6. The method of refining rosin which includes admixing rosin in solution in a solvent capable as such of substantial immiscibility with resorcinol and boric acid with resorcinol and boric acid in solution in a solvent capable as such of substantial immiscibility with the rosin solvent and separating resorcinol, boric acid and color bodies from the rosin-solvent solution.

7. The method of refining rosin which includes admixing rosin in solution in a solvent capable as such of substantial immiscibility with a solution of resorcinol and boric acid in an alcohol a solution of resorcinol and boric acid in a water-miscible solvent with resorcinol and boric acid in solution in a water-miscible solvent and separating resorcinol, boric acid and color bodies from the rosin-solvent solution.

15. The method of refining rosin which includes admixing rosin in solution in gasoline with resorcinol and boric acid in solution in a water-miscible solvent capable as such of substantial immiscibility with gasoline and separating resorcinol, boric acid and color bodies from the rosin-gasoline solution.

16. The method of refining rosin which includes admixing rosin in solution in a solvent capable as such of substantial immiscibility with resorcinol and a boron compound with a mixture of resorcinol and a suitable boron compound and separating resorcinol, boron compound and color bodies from the rosin-solvent solution.

17. The method of refining rosin which includes admixing rosin in solution in a solvent capable as such of substantial immiscibility with resorcinol and boric anhydride with a mixture of resorcinol and boric anhydride and separating resorcinol, boric anhydride and color bodies from the rosin-solvent solution.

18. The method of refining rosin which includes admixing rosin in solution in a solvent capable as such of substantial immiscibility with resorcinol and borax with a mixture of resorcinol and borax and separating resorcinol, borax and color bodies from the rosin-solvent solution.

19. The method of refining rosin which includes subjecting rosin to treatment with a mixture of resorcinol and boric acid under conditions adapted to effect removal from the rosin of color bodies contained therein and separating resorcinol, boric acid and color bodies from the refined rosin.

20. The method of refining rosin which includes subjecting rosin to treatment with a mixture of resorcinol and a suitable boron compound under conditions adapted to effect removal from the rosin of color bodies contained therein and separating resorcinol, boron compound and color bodies from the refined rosin.

21. The method of refining rosin which includes subjecting rosin to treatment with a mixture of resorcinol and boric anhydride under conditions adapted to effect removal from the rosin of color bodies contained therein and separating resorcinol, boric anhydride and color bodies from the refined rosin.

22. The method of refining rosin which includes subjecting rosin to treatment with a mixture of resorcinol and borax under conditions adapted to effect removal from the rosin of color bodies contained therein and separating resorcinol, borax and color bodies from the refined rosin.

23. The method of refining rosin which includes admixing rosin in solution in a solvent capable as such of substantial immiscibility with a solution of resorcinol and boric anhydride in a water-miscible solvent with resorcinol and boric anhydride in solution in a water-miscible solvent.

24. The method of refining rosin which includes admixing rosin in solution in a solvent capable as such of substantial immiscibility with a solution of resorcinol and borax in a water-miscible solvent with resorcinol and borax in solution in a water-miscible solvent.

25. The method of refining rosin which includes admixing rosin in solution in a solvent capable as such of substantial immiscibility with a solution of resorcinol and a suitable boron compound in a water-miscible solvent with a resorcinol and a suitable boron compound in solution in a water-miscible solvent.

26. The method of refining rosin which includes admixing rosin in solution in a solvent capable as such of substantial immiscibility with resorcinol and boric anhydride with a mixture of resorcinol and boric anhydride and separating resorcinol, boric anhydride and color bodies from the rosin-solvent solution.

27. The method of refining rosin which includes admixing rosin in solution in a solvent capable as such of substantial immiscibility with resorcinol and borax with a mixture of resorcinol and borax and separating resorcinol, borax and color bodies from the rosin-solvent solution.

28. The method of refining rosin which includes admixing rosin in solution in a solvent capable as such of substantial immiscibility with resorcinol and a suitable boron compound with a mixture of resorcinol and a suitable boron compound and separating resorcinol, boron compound and color bodies from the rosin-solvent solution.

JOSEPH N. BORGLIN.